Sept. 20, 1966          H. PRIEBS          3,274,349
MEMORY AND CONTROL DEVICE FOR COMPUTING MACHINES OR THE LIKE
Filed Jan. 28, 1964          4 Sheets-Sheet 3

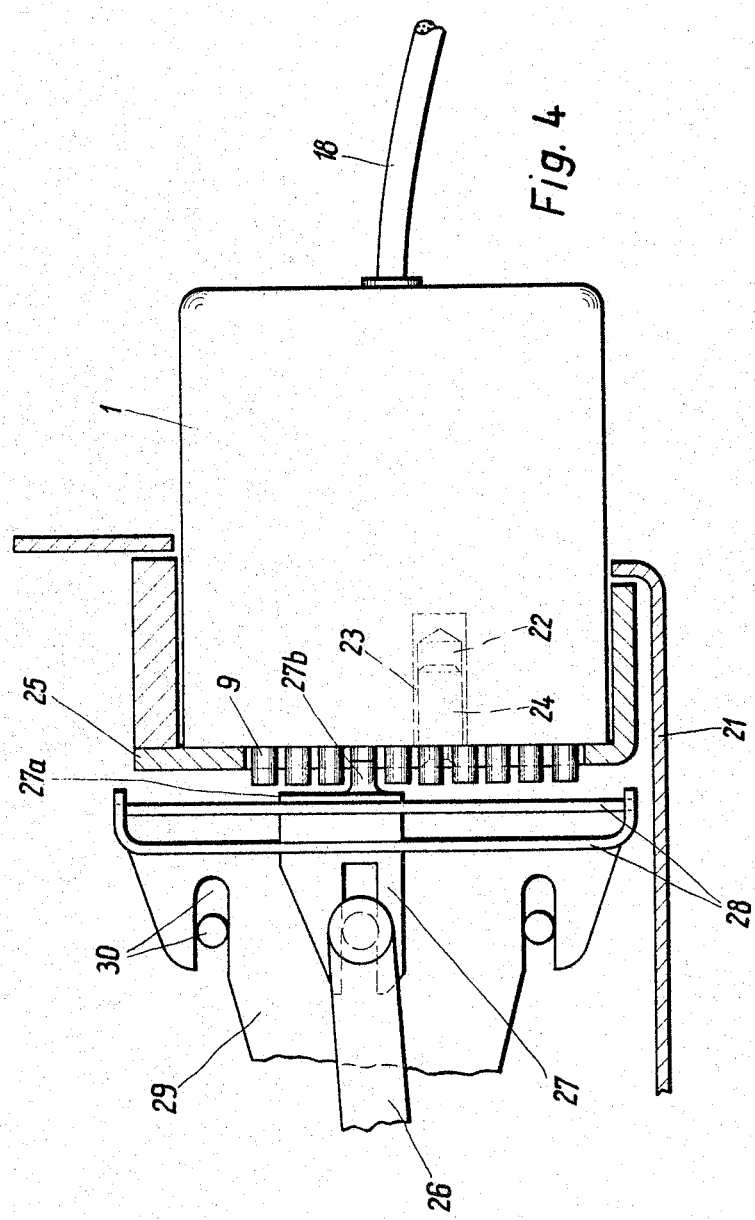

United States Patent Office 3,274,349
Patented Sept. 20, 1966

3,274,349
MEMORY AND CONTROL DEVICE FOR
COMPUTING MACHINES OR THE LIKE
Horst Priebs, Bielefeld, Germany, assignor to Anker-Werke Aktiengesellschaft, Bielefeld, Germany, a corporation of Germany
Filed Jan. 28, 1964, Ser. No. 341,167
Claims priority, application Germany, Feb. 2, 1963,
A 42,233
7 Claims. (Cl. 200—5)

My invention relates to a memory device for computing or printing business machines, particularly machines of the type in which selected positions of movable machine elements are to be read-out, memorized and subsequently transferred electrically into a punch-card device, magnetic tape recording device or other equipment connected to the business machine proper.

There are known memory devices of this type for responding to the positioning of translatorily displaceable type bars that print numerals from 0 to 9. The positions of the bars are scanned or read-out directly or through code stencils, and the numerical values thus determined are transmitted in form of switching pulses through electric switches and multiple-wire cables to a punching device, an electronic computer, or other apparatus to be controlled in accordance with the numerical values thus taken from those registered in the business machine.

Such memory devices have the disadvantage of requiring a large amount of intricate wiring in the pulse-issuing machine, as well as a large amount of space for accommodating the switching components. The transmission device necessary between the mechanical equipment and the electrical apparatus likewise require much material and space. In some of the known transmitting devices, a value once entered into the memory is not automatically cleared prior to entering a new value, but must be cleared by a separate machine run, or by actuating a special control key of the business machine. Such non-automatic clearing of values previously entered into a memory device has the critical disadvantage that faulty transmitting operations are inevitable, particularly if one and the same business machine is alternately serviced by different persons.

Also for the purpose of transferring the key or type-lever movements of a typewriter into a punch-card device or the like, the equipment heretofore known for such purposes leaves much to be desired on account of an excessive amount of wiring, switches, relays and other components which render the equipment excessively susceptible to trouble and considerably increase the space requirements, thus also rendering the servicing of the machinery awkward or inconvenient.

It is an object of my invention to avoid the above-mentioned shortcomings and deficiencies of data reading and storing memory devices for business machines, and to provide a memory device of comparatively small dimensions which is composed of relatively simple and, therefore, reliable components, and which also does away with the necessity of providing an intricate wiring system within the business machine proper.

According to the invention, as to one of its features, a business-machine memory device for reading and storing data from respective positions of displaceable machine elements is essentially designed as a plug-in coupling that contains a number of selectively operable spring-biased switching members, and contains the wiring, required for the selective closing of various memory circuits, only in form of extraneous electrical conductors, preferably combined in a cable extending from the plug-in device.

These and more specific features, set forth with particularity in the claims annexed hereto, as well as other objects and advantages of my invention, will be apparent from, and will be described in, the following with reference to embodiments of memory devices according to the invention illustrated by way of example on the accompanying drawings in which:

FIG. 4 is a side elevation of a memory device according to FIGS. 1 and 2, or FIG. 3 seated in coactive relation to a mechanical contact controller of a calculating machine having a type-bar printing mechanism.

Figure 1:
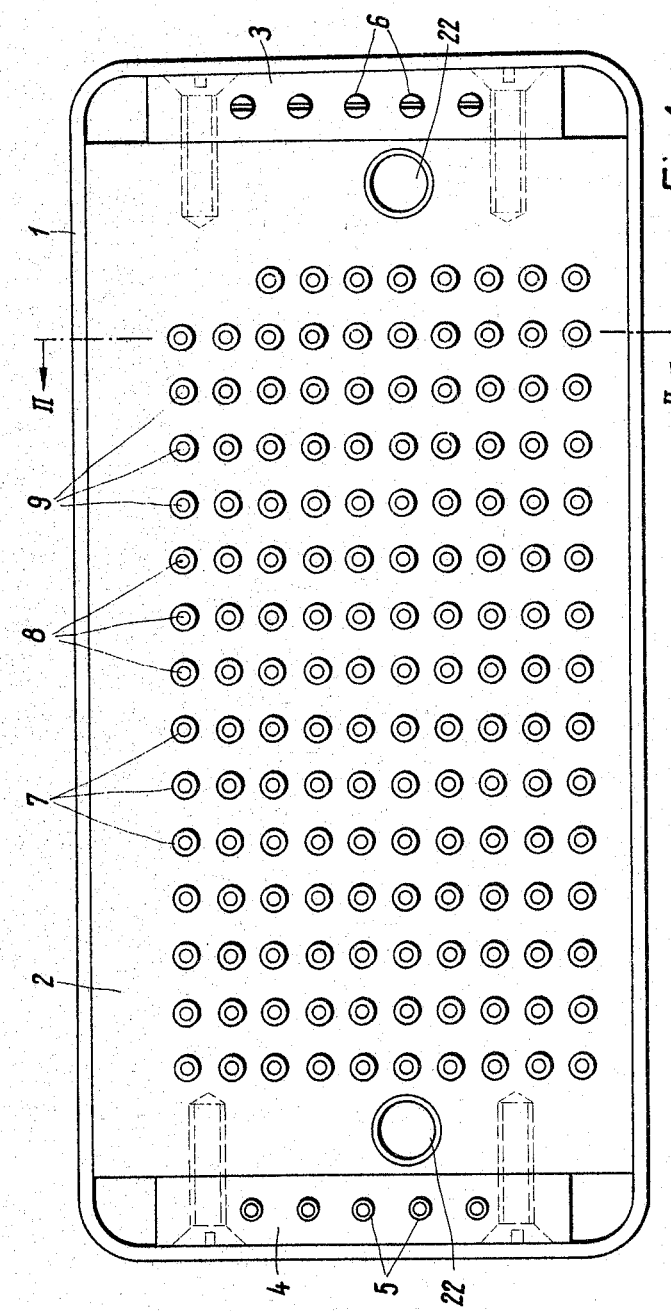
FIG. 1 is a front view of a mechanical-electrical value memory for a calculating machine.
Figure 2:
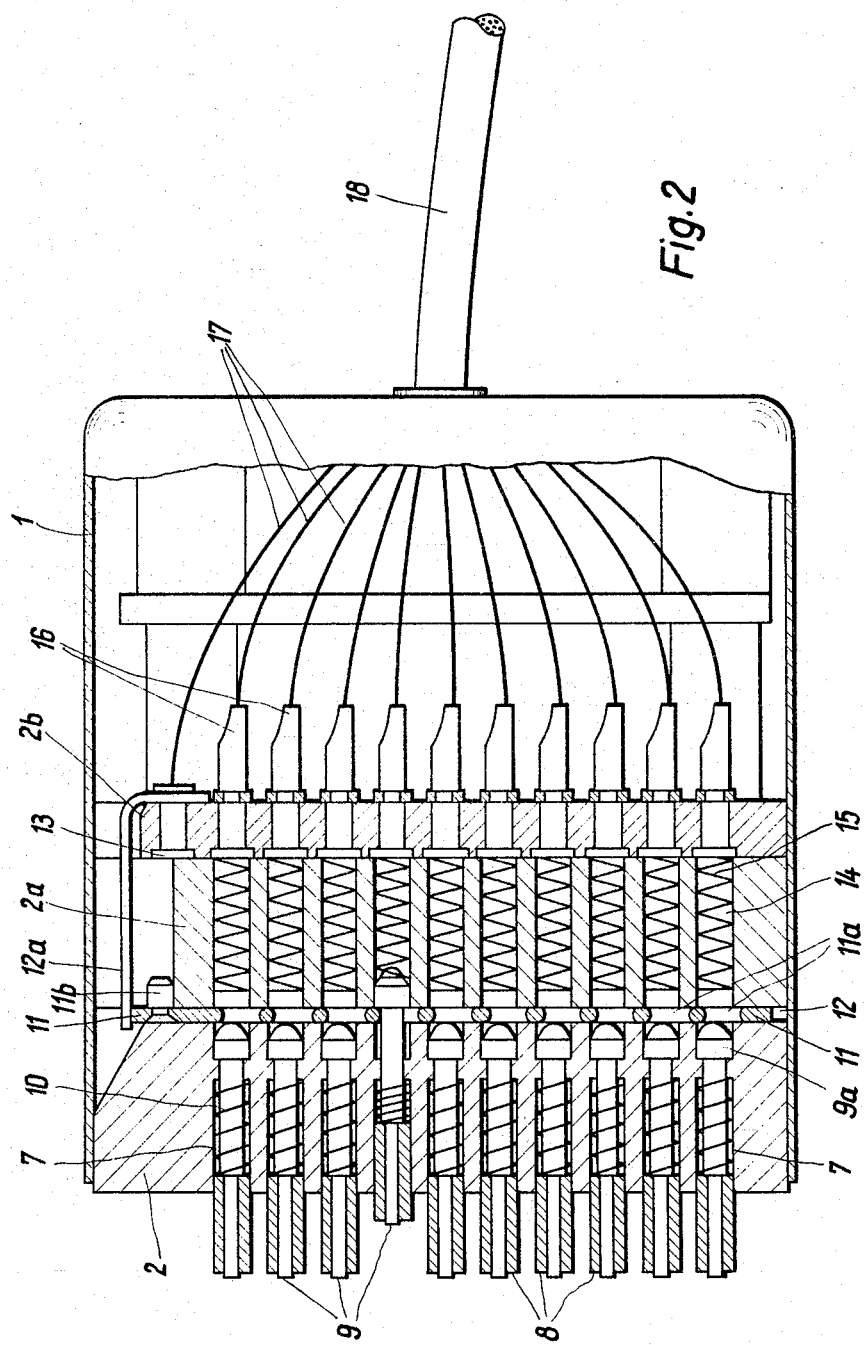
FIG. 2 is a cross section through one of the switch-contact rows of the same device, the section being taken along the line II—II in FIG. 1.

As shown in FIGS. 1 and 2, the memory device comprises a housing 1 joined with an insulating base 2 and forming a plug-in connector together therewith. Several other insulating parts 2a, 2b, 3 and 4 are joined with the base 2 within the housing 1. The insulating parts 3 and 4 form ordinary electric plug-in coupling units respectively. Part 4 located on the left-hand side (FIG. 1), is provided with electric contact sockets 5 and thus forms a five-pole female half-portion of a plug coupling. The part 3 located at the right (FIG. 1), is provided with five contact pins and thus forms a five-pole male portion of another coupling. The two coupling units 3 and 4 serve for connecting electric current supply and control leads with the business machine in which the illustrated memory device is seated when in operative condition.

The insulating base 2 has a multiplicity of bores 7 in which respective guide bushings 8 are rigidly seated. Switching pins 9 of elongated shape are longitudinally displaceable in the respective bushings. The pins are arranged in a number of parallel rows. In the illustrated embodiments, each vertical row (FIG. 1) has ten pins, and each of them is horizontally aligned with corresponding pins of the adjacent vertical rows. Consequently each vertical row, for use of the memory device with a calculating machine, denotes one decimal digit. Accordingly the ten pins of each row denote the ten digit values 0–9. The number of vertical rows (a total of fifteen being provided in the illustrated embodiment) corresponds to the necessary total number of decimal positions.

As is apparent from FIG. 2, each switching pin 9 is biased by a helical spring 10 which normally holds the pin in a position where it protrudes out of the planar front face of the base 2. Each switch pin 9 has a conical or semi-spherical head 9a at the inner end. In the idle position of each pin, the spring 10 forces the head 9a against a peripheral shoulder formed by the bore 7.

Each individual row of switch pins is provided with a latch bar 11 which is common to all ten pins 9 of the row. The bar 11 is displaceable in a groove 12 so that it can shift in a direction transverse to the axial directions of the pins 9. The latch bar 11 has bores 11a uniformly spaced from each other in accordance with the mid-spacing of the switch pins 9, the diameter of each bore being slightly larger than the outer diameter of each pin head 9a. Each latch bar 11 forms an interlock for the switch pins and consists of conducting material thus also forming an electric conductor for selective cooperation with the individual switch pins.

Each of the displaceable contact bars 11 is normally forced downwardly (FIG. 2) by a leaf spring 12a of conducting material. In this position of rest normally occupied by each bar 11, the mid-spacings of the bores 11a and of the pin heads 9a are displaced from each other. The leaf spring 12a serves as a current conductor and is fastened to the insulating body 2b by means of a hollow rivet or threaded bushing 13. A stop pin 11b defines the illustrated lowermost position normally occupied by the bar 11 (FIG. 2).

The insulating body 2a (FIG. 2) possesses as many bores 14 as there are switching pins 9. The bores 14 are coaxially aligned with the switch pins 9 and contain each a contact spring. One end of each spring is conductively fastened to a soldering lug or other terminal 16 mounted on the insulating body 2b in axial relation to the bore 14. However, the contact springs 15, when in relaxed condition, do not reach to the opposite end of the bore 14 but stay short of the conducting bar 11.

Figure 3:
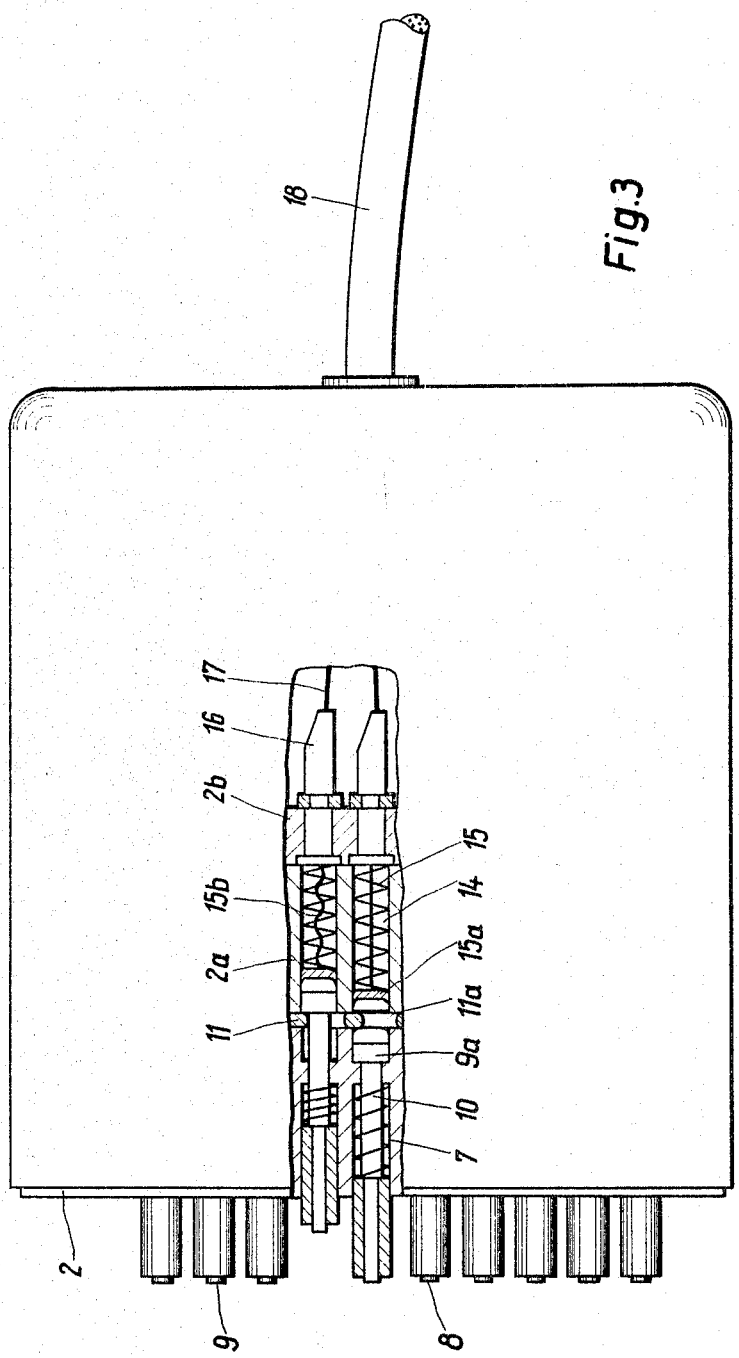
FIG. 3 is a top view, shown partially in section, of a somewhat modified memory device generally similar to that of FIGS. 1 and 2.

If the amount of current to be controlled is larger than can be reliably passed through the cross section of the contact springs 15, it is advisable to provide each contact spring 15, according to FIG. 3, with a contact plate, disc or cup 15a which is separately connected by a litz wire 15b with the lugs or terminals 16. On the opposite side, each disc 15a matches the shape of the pin head 9a, thus securing a reliable contact engagement.

The terminals 16, including the fastening rivet or terminals 13 (FIGS. 2 or 3), are connected with respective wires 17 of a multiple-wire cable 18 and are thus in electrical connection with a punch-card device or other signal receiving apparatus. To make certain that the plug-in type memory device can be reliably seated in active condition within the signal-issuing business machine 21 (FIG. 4), the insulating base 2 of the memory device is provided with centering bores 22 (FIG. 1) formed by wear-resistant bushings 23 (FIG. 4). When the memory device is plugged into the business machine 21, the centering bores 22 are engaged by centering pins 24 (FIG. 4) of the business machine so that the memory device is properly seated and oriented.

The centering bolts are fastened on a bottom plate 25 which forms part of a plug-receiving socket in the signal-issuing business machine 21 here exemplified as a portion of a calculating machine equipped with a type-bar printing mechanism.

The scanning of the working positions occupied at the time by the type bars of the machine is effected by a lever 26 (FIG. 4) which imparts the movement of the type bars (not illustrated) to a control member 27 thereby moving this member upwardly or downwardly in accordance with the vertical displacement of a type bar. A lateral lug 27a of the control member 27 carries a pusher pin 27b which, when thus placed into a position corresponding to that of the type bar, is accurately opposite one of the switch pins 9 in the corresponding vertical row of the memory device. The control member 27 is articulately joined with the transmission lever 26 by a pin-and-slot junction and is vertically displaceable in a guide between vertical rails 28 parallel to the rows of switch pins 9. Such a lever 26 and appertaining control member 27 is provided for each of the vertical pin rows. However, the parallel guide 28 is common to all pin rows and fastened in a single housing 29. The housing 29 is displaceable in a direction parallel to the axes of the switch pins 9. For this purpose the housing is guided by a pin-and-slot guide 30 and is driven to perform the axial pushing motion toward the memory device with the aid of a driving lever (not illustrated).

Further details of the business machine in which the plugged-in memory device is seated, as well as the electrically controlled equipment that may be connected to the cable 18, are not illustrated and described herein because they do not form part of the present invention and may have designs and functions otherwise known or conventional. If desired, however, reference for a complete example of use may be had to my copending application Serial No. 341,168, filed January 28, 1964, for Electromechanical Apparatus for Converting Coded Into Decoded Digital Values, describing and illustrating (at 33) a memory device according to the present invention interposed between a mechanical business machine and an electronic binary computer.

The operation of the above-described memory device is as follows.

After the control member 27 for each pin row is adjusted by means of the appertaining lever 26 and consequently may have been shifted upwardly or downwardly (FIG. 4), the machine is prepared for entering the value data into the memory device. The adjustment just mentioned may occur simultaneously with the conventional setting of the type bars in the business machine, or it may be performed immediately thereafter. The machine then displaces the control-member housing 29 toward the right so that the pusher pin 27b will act upon the one selected switch pin 9. This takes place in each row and hence for each decimal digit position in which a memory entry is to be made. During the pushing motion, the pin head 9a enters into the axially displaced bore 11a of the bar 11 (FIG. 2) and thereby presses the bar 11 upwardly against the spring 12a.

As soon as the pin head 9a has moved far enough toward the right in opposition to the force of its return spring 10, the bar 11 snaps behind the pin head 9a under the force of the leaf spring 12, thus latching the switch pin 9 in the depressed position. The pin, therefore, remains in this position when thereafter its head 9a abuts from the right against the bar 11. As the pin head 9a penetrates into the bore 14 of the insulating body 2a, it engages the contact spring 15 (FIG. 2) or the contact plate 15a (FIG. 3). As soon as the pusher pin 27b releases the switch pin 9, and the back of pin head 9a is forced against the bar 11 by the pressure of springs 10 and 15, a selector circuit is closed through the leaf spring 12a and one of the terminal lugs 16 so that a switching pulse now passes through the multiple-wire cable 17, 18 to the electrical apparatus connected to the memory device.

The switch-on position of the depressed switch pin 9 remains preserved until another switch pin in the same row is being depressed in the manner described above. Then the interlocking bar 11 with its bores 11a is again displaced and the previously arrested switch pin 9 is released so that the return spring 10 causes it to return to the starting position and to interrupt the selector circuit previously closed.

If desired, two or more interlocking bars 11 can be joined together so that, for example, when continuous numbers from 1 to 99, occupying two decimal rows, are being registered, a subsequent entering of only one numeral into a row will cause the previously depressed switch pins of an appertaining second row to be also released.

To those skilled in the art, it will be obvious upon a study of this disclosure that with respect to various structural details, arrangement of components and number of components, as well as regards the purposes for which the memory device is to be used, my invention permits of various modifications and hence can be given embodiments other than particularly illustrated and described herein, without departing from the essential features of my invention and within the scope of the claims annexed hereto.

I claim:

1. A business-machine memory device for reading and storing data from respective positions of displaceable machine elements, comprising a multiplicity of electrically conducting switching members arranged in parallel rows, each row corresponding to one of the respective displaceable machine elements to be responded to, and the number of members in each row corresponding to the maximum of the bits of data storable in said row; a housing structure common to said switching members and having a front face from which said rows of members are accessible externally of the housing, said housing forming a plug-in connector detachably seatable in a business machine with said front face positioned to face the displaceable machine elements to be responded to; said switching members in each row being selectively actuable by one of the respective machine elements in the seated conditions of said housing; an interlock mechanism for each of said rows of members connected in said housing with the members of said respective rows of members for retaining previously selected members in each of said rows actuated until actuation in the respective rows of other ones of said members, said mechanisms being adapted to release said previously selected members when said other ones of said members are actuated; and electric leads connected to said members and extending out of said housing for providing selectively closed circuits depending upon which of said switching members are activated at a time.

2. In a detachable memory device according to claim 1, said housing structure comprising a base plate having a planar outer surface which forms said front face; said switching members being movably seated and mutually insulated in said base plate and spring-biased to normally protrude out of said base plate so as to be selectively moved toward the housing interior when actuated.

3. A business-machine memory device for reading and storing data from respective positions of displaceable machine elements, comprising a base plate having a planar front face, a cover disposed on said base plate and forming together therewith a housing detachably seatable in a business machine; a multiplicity of switch means each having a switch pin axially displaceable in said base plate, each of said pins having a biasing spring urging the pin to a position protruding outwardly from said front face, said pins being individually displaceable toward the interior of said housing and being arranged in parallel rows, each row corresponding to one of the respective displaceable machine elements to be responded to, and the number of switch pins in each row corresponding to the maximum of the bits of data storable in said row; said pins in said row being selectively actuable by one of the respective machine elements in the seated condition of said housing; said switch pins having respective conductive heads, an interlocking latch bar for each of said rows of pins extending in said housing along the heads of said pins of each of said rows and being displaceable along the respective row and latchingly engageable with an actuated pin in said row for latching it until another pin in said row is being actuated, said latch bar being adapted to release said actuated pin when said other pin is being actuated; and current leads extending out of said housing and being connected to said respective switch means for closing respective selector circuits depending upon which switch pins are actuated at a time.

4. In a detachable memory device according to claim 3, said pin heads and said latch bar being conductive, and one of said leads being connected to each of said respective bars, so that the head of an actuated pin when latched by a bar closes one of said selector circuits through said bar.

5. In a detachable memory device according to claim 4, an insulating carrier extending in said housing parallel to said base plate and having terminals to which the respective leads for said switch pins are attached, said terminals being coaxially spaced from said respective pin heads, and conductive springs extending from said terminals toward said respective heads but ending short of said heads for contact engagement with the head of only the one pin latched at a time by one of said bars.

6. In a detachable memory device according to claim 4, a conductive leaf spring engaging said latch bar for biasing it to latching position, said leaf spring being connected to one of said leads so that said selector circuits are closed through a latched pin and the latch bar and said leaf spring.

7. In a detachable memory device according to claim 5, comprising a contact plate attached to the end of each of said respective springs and engageable by the head of said latched pin.

References Cited by the Examiner
UNITED STATES PATENTS

| | | | |
|---|---|---|---|
| 2,490,348 | 12/1949 | Ghertman | 235—61 |
| 3,125,895 | 3/1964 | Ross | 200—5 |
| 3,182,163 | 5/1965 | Baumer | 200—168 |
| 3,193,635 | 7/1965 | Hood | 200—51.09 X |

ROBERT K. SCHAEFER, *Primary Examiner.*

KATHLEEN H. CLAFFY, *Examiner.*

M. GINSBURG, *Assistant Examiner.*